Patented Nov. 26, 1946

2,411,586

UNITED STATES PATENT OFFICE 2,411,586

PREPARATION OF BARIUM SALTS OF CYCLIC - ALIPHATIC ETHER ALCOHOLS

John R. Morris, Beacon, N. Y., assignor to The Texas Company, New York, N. Y., a corporation of Delaware No Drawing. Application February 9, 1943, Serial No. 475,298

5 Claims. (Cl. 260—613)

This invention relates to an improved method of preparing the barium salts of cyclic-aliphatic ether alcohols and particularly to a method of preparation employing barium hydroxide.

The particular compounds to which the methods of the present invention are applicable are those cyclic-aliphatic ether alcohols described in the co-pending applications of Rush F. McCleary, Serial Nos. 411,696 and 418,161 filed September 20, 1941 and November 7, 1941, respectively. The application, Serial No. 418,161, has issued into U. S. Patent No. 2,361,043, granted October 24, 1944. These compounds contain an aliphatic alcohol or mercaptan radical linked to a cyclic nucleus through an ether or thioether linkage. The replaceable hydrogen to be substituted is that existing in the hydroxyl or sulfhydryl radical attached to the aliphatic substituent of the compound.

The reactivity of the hydroxyl or sulfhydryl radicals of these compounds as it pertains to the formation of the metal salt is materially different from that of the usual aliphatic alcohol or phenol. The generally-accepted methods of preparing metal alcoholates have met with little or no success in so far as they are applicable to the preparation of the polyvalent metal salts.

However, in accordance with the present invention, a method for preparing the barium salts of the cyclic-aliphatic ether alcohols has been developed which provides a much greater yield of barium salt than any of the accepted methods of preparation.

It has been found that by adding barium hydroxide to a metathetical reactant and reacting the resulting reagent with a cyclic-aliphatic ether alcohol, a barium salt of the cyclic-aliphatic ether alcohol is obtained in yields greatly exceeding those obtained solely by the metathesis reaction. The type of metathesis reaction referred to is that reaction in which the replaceable hydrogen of the alcohol is directly displaced by barium from a barium compound designated herein as the metathetical reactant. These metathetical reactants are the barium derivatives of an organic or inorganic compound possessing a low ionization constant. Among the types of compounds which fall within this category are the phenolates, alcoholates, weakly acidic inorganic salts, hydroxylates, etc.

The cyclic-aliphatic ether alcohols whose barium salts may be prepared by the method of the present invention include those compounds within the classification described by the general formula:

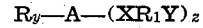

$$R_y - A - (XR_1Y)_z$$

wherein A may be an aromatic or cyclo-aliphatic nucleus, R may be a hydrogen, alkyl, aryl, aralkyl, cycloalkyl or naphthenyl radical, $R_1$ may be an aliphatic radical which may contain oxygen or sulfur substituents or both in the form of ether and thioether linkages, X may be either oxygen or sulfur, Y may be a hydroxyl or sulfhydryl radical, and $y$ and $z$ integers of one or more. The preferred compounds within this classification are those compounds in which A is an aromatic nucleus, and $R_1$ is an aliphatic constituent containing from 2 to 5 carbon atoms.

This improved method of preparation may be carried out at temperatures between 150 and 250° C., preferably between 185 and 220° C., with or without the aid of a hydrocarbon solvent. In order to effectuate a more complete separation of the reaction product, it is desirable to operate in the presence of a solvent such as benzene, toluene, or xylene. Although no limitation as to the type of barium hydroxide used in the reaction has been mentioned, it has been found preferable to operate with anhydrous barium hydroxide. However, when using the hydrates of barium hydroxide the water of hydration will be driven off by the temperatures at which the reaction proceeds.

In order to illustrate the reaction of the present invention the following example is presented:

300 grams of diamyl phenoxy ethanol were reacted with a mixture of 124 grams of barium phenolate and 105 grams of anhydrous barium hydroxide in the presence of 600 ccs. of toluene. The reaction mixture was refluxed over an automatic water separator until no more water was obtained. This reaction required 12 hours. The mass was then filtered and 100 grams of 300 pale oil added. The concentrate of the resulting barium diamyl phenoxy ethylate in the 300 pale oil was then stripped of solvent. The yield of the barium salt was 68% of the theoretical yield.

The yields obtained according to this reaction greatly exceed those obtained solely by the reaction of barium phenolate and diamyl phenoxy ethanol, and can be further increased by increasing the proportion of anhydrous barium hydroxide to the metathetical reactant which, in this case, is barium phenolate.

Obviously many modifications and variations of the invention, as hereinbefore set forth, may be made without departing from the spirit and scope thereof, and therefore only such limitations should be imposed as are indicated in the appended claims.

I claim:

1. A method of preparing barium salts of carbocyclic-aliphatic ether alcohols, which comprises reacting a compound of the following general formula $$R_y-A(XR_1Y)_z$$

in which A is a carbocyclic nucleus, R is a member of the class consisting of hydrogen and alkyl radicals, $R_1$ is an aliphatic radical, X is oxygen, Y is a hydroxyl radical, and $y$ and $z$ are small whole numbers, with a mixture of a barium salt of a weakly acidic compound and barium hydroxide.

2. A method of preparing barium salts of carbocyclic-aliphatic ether alcohols, which comprises reacting a compound of the following general formula $$R_y-A(XR_1Y)_z$$

in which A is a carbocyclic nucleus, R is a member of the class consisting of hydrogen and alkyl radicals, $R_1$ is an aliphatic radical, X is oxygen, Y is a hydroxyl radical, and $y$ and $z$ are small whole numbers, with a mixture of barium hydroxide and a barium salt possessing a low ionization constant at temperatures between 150 and 250° C. in the presence of a hydrocarbon solvent.

3. A method of preparing barium salts of carbocyclic-aliphatic ether alcohols, which comprises reacting a compound of the following general formula $$R_y-A(XR_1Y)_z$$

in which A is a carbocyclic nucleus, R is a member of the class consisting of hydrogen and alkyl radicals, $R_1$ is an aliphatic radical, X is oxygen, Y is a hydroxyl radical, and $y$ and $z$ are small whole numbers, with a reagent comprising a barium salt possessing a low ionization constant and containing a substantial proportion of barium hydroxide.

4. A method of preparing barium salts of carbocyclic-aliphatic ether alcohols, which comprises reacting a compound of the following general formula $$R_y-A(XR_1Y)_z$$

in which A is an aromatic nucleus, R is a member of the class consisting of hydrogen and alkyl radicals, $R_1$ is an aliphatic radical containing from 2 to 5 carbon atoms, X is oxygen, Y is a hydroxyl radical, and $y$ and $z$ are small whole numbers, with a reagent comprising a barium salt of a weakly acidic compound and anhydrous barium hydroxide at temperatures between 150 and 250° C. in the presence of a hydrocarbon solvent.

5. A method of preparing the barium salt of an alkyl phenoxy ethanol, which comprises reacting the alkyl phenoxy ethanol with a mixture of anhydrous barium hydroxide and a barium salt possessing a low ionization constant at reflux temperatures in the presence of a hydrocarbon solvent.

JOHN R. MORRIS.